(12) United States Patent
Brown et al.

(10) Patent No.: US 10,574,539 B2
(45) Date of Patent: Feb. 25, 2020

(54) SYSTEM COMPLIANCE ASSESSMENT UTILIZING SERVICE TIERS

(71) Applicant: Hartford Fire Insurance Company, Hartford, CT (US)

(72) Inventors: Patrick D. Brown, Marlborough, CT (US); John G. Buccetti, Wallingford, CT (US); Daniel R. Console, South Windsor, CT (US); Lisa J. Kissane, Oakdale, CT (US); Robert M. Nichols, North Granby, CT (US); Hugh J. Quinn, West Hartford, CT (US); Irma Rivera, East Berlin, CT (US); Kenneth A. Saucier, Bristol, CT (US); Angela L Secondino, East Haven, CT (US); Susan R. Vecchio, Glastonbury, CT (US); Donna M. Warnock, Vernon, CT (US)

(73) Assignee: Hartford Fire Insurance Company, Hartford, CT (US)

(*) Notice: Subject to any disclaimer, the term of this patent is extended or adjusted under 35 U.S.C. 154(b) by 88 days.

(21) Appl. No.: 15/246,819

(22) Filed: Aug. 25, 2016

(65) Prior Publication Data
US 2018/0062941 A1 Mar. 1, 2018

(51) Int. Cl.
*H04L 12/24* (2006.01)

(52) U.S. Cl.
CPC ...... *H04L 41/5003* (2013.01); *H04L 41/5009* (2013.01); *H04L 41/5019* (2013.01)

(58) Field of Classification Search
CPC .................................................. H04L 41/5003
See application file for complete search history.

(56) References Cited

U.S. PATENT DOCUMENTS

| | | | |
|---|---|---|---|
| 8,027,903 B2 | 9/2011 | Bishop et al. | |
| 8,156,028 B2 | 4/2012 | Bishop et al. | |
| 8,341,014 B2 | 12/2012 | Bobak et al. | |
| 2005/0065841 A1 | 3/2005 | Middleton | |
| 2006/0129687 A1* | 6/2006 | Goldszmidt | G06F 9/505 709/229 |

(Continued)

*Primary Examiner* — Nicholas P Celani
(74) *Attorney, Agent, or Firm* — Buckley, Maschoff & Talwalkar LLC

(57) ABSTRACT

A data store may contain data describing systems associated with an enterprise. The data store may contain electronic records, each containing a record identifier and a set of record characteristic values, including a service tier goal. A compliance score may be automatically calculated based on an assessment of record characteristic values, the service tier goal, and at least a system availability value, an incident response time value, and an incident restoration time value. A remediation recommendation may be generated, including steps that, when performed, will result in the selected system meeting the service tier goal. An indication representing the remediation recommendation may then be transmitted in connection with an interactive user interface display. According to some embodiments, remediation data is automatically routed to appropriate entities within the enterprise and updates associated with the remediation recommendation are automatically tracked as remediation steps are performed in connection with the selected system.

17 Claims, 15 Drawing Sheets

(56) References Cited

U.S. PATENT DOCUMENTS

| | | | |
|---|---|---|---|
| 2006/0224479 A1* | 10/2006 | Bishop | G06Q 40/00 705/35 |
| 2009/0171707 A1* | 7/2009 | Bobak | G06Q 10/06 705/7.23 |
| 2011/0184745 A1 | 7/2011 | Brennan et al. | |
| 2012/0041858 A1* | 2/2012 | Lewis | G06Q 10/04 705/34 |
| 2015/0095102 A1 | 4/2015 | Hanley | |
| 2015/0332184 A1 | 11/2015 | Osborn | |
| 2016/0110817 A1 | 4/2016 | Buccetti et al. | |

* cited by examiner

SYSTEM COMPLIANCE ASSESSMENT UTILIZING SERVICE TIERS

BACKGROUND

An enterprise might utilize thousands of different types of computer systems. For example, a company might execute various software applications, servers, business information data services, purchase order processing, customer service interfaces, etc. during the typical operation of its business. Different computer systems may, of course, be associated with different levels of importance for the enterprise. For example, it might be critical to a business that a particular customer interface remains operable for as much time as possible (with even a few hours of downtime result in substantial losses), while another computer system may cause little harm to the enterprise if it were to stop operating for even a few weeks. Manually evaluating and allocating resources among such computer systems can be an expensive, time consuming, and error prone task—especially when a substantial number of computer systems are involved.

It would be desirable to provide systems and methods to automatically assess systems for an enterprise and to generate and maintain electronic records and scores representing those systems in a way that allows for flexibility and effectiveness with respect to remedial recommendations.

SUMMARY OF THE INVENTION

According to some embodiments, systems, methods, apparatus, computer program code and means automatically assess systems for an enterprise and to generate and maintain electronic records and scores representing those systems in a way that allows for flexibility and effectiveness with respect to remedial recommendations. In some embodiments, a data store may contain data describing systems associated with an enterprise. The data store may contain electronic records, each containing a record identifier and a set of record characteristic values, including a service tier goal. A compliance score may be automatically calculated for the selected system based on an assessment of record characteristic values for the selected system, the service tier goal, and at least a system availability value, an incident response time value, and an incident restoration time value. A remediation recommendation may be generated for the selected system, including steps that, when performed, will result in the selected system meeting the service tier goal. An indication representing the remediation recommendation for the selected system may then be transmitted in connection with an interactive user interface display. According to some embodiments, remediation data may be automatically routed to appropriate entities within the enterprise and the system may automatically track updates associated with the remediation recommendation as remediation steps are performed in connection with the selected system.

Some embodiments comprise: means for accessing a data store containing data describing systems associated with the enterprise, the data store containing a set of electronic records, wherein each electronic record contains a record identifier and a set of record characteristic values, including a service tier goal; means for automatically calculating, by a back-end application computer server, a compliance score for the selected system based on an assessment of record characteristic values for the selected system, the service tier goal, and at least a system availability value, an incident response time value, and an incident restoration time value; means for automatically generating, by the back-end application computer server, a remediation recommendation for the selected system, the remediation recommendation including steps that, when performed, will result in the selected system meeting the service tier goal; means for transmitting an indication representing the remediation recommendation for the selected system in connection with an interactive user interface display; means for arranging for remediation data associated with the remediation recommendation for the selected system to be automatically routed to appropriate entities within the enterprise, wherein a communication port coupled to the back-end application computer server facilitates an exchange of electronic messages, via a distributed communication network, supporting the interactive user interface display and the routing of remediation data as appropriate; and means for automatically tracking updates associated with the remediation recommendation as remediation steps are performed in connection with the selected system.

In some embodiments, a communication device associated with a back-end application computer server exchanges information with remote devices. The information may be exchanged, for example, via public and/or proprietary communication networks.

Technical effects of some embodiments of the invention are improved and computerized ways to automatically assess systems for an enterprise and to generate and maintain electronic records and scores representing those systems in a way that allows for flexibility and effectiveness with respect to remedial recommendations. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be transmitted to remote devices from a back-end application server and electronic records may be routed for a remediation process as appropriate, thus improving the overall performance of the system associated with message storage requirements and/or bandwidth considerations (e.g., by reducing the number of messages that need to be transmitted via a network). Moreover, embodiments associated with automatic assessments might further improve communication network performance, user interactions, real time chat or telephone call center responsiveness (e.g., by better preparing and/or allocating hardware asset resources), etc.

Figure 1:
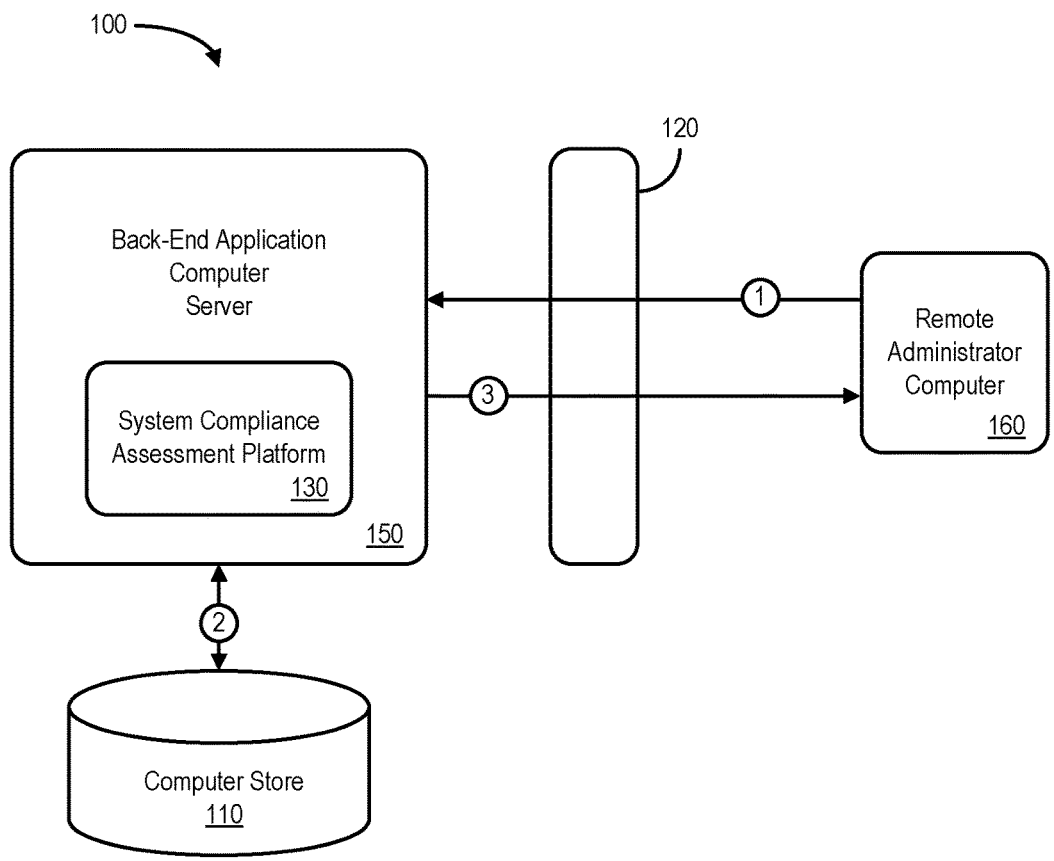
FIG. 1 is a high-level block diagram of a system according to some embodiments.

An enterprise might utilize thousands of different types of computer systems and different computer systems may be associated with different levels of importance for the enterprise. Manually evaluating and allocating resources among such computer systems can be an expensive, time consuming, and error prone task—especially when a substantial number of computer systems are involved. It would be desirable to provide systems and methods to automatically assess systems for an enterprise and to generate and maintain electronic records and scores representing those systems in a way that allows for flexibility and effectiveness with respect to remedial recommendations. FIG. 1 is a high-level block diagram of a system 100 according to some embodiments of the present invention. In particular, the system 100 includes a back-end application computer server 150 that may access information in a computer store 110 (e.g., storing a set of electronic records representing computer systems, each record including one or more service tier goals, attribute variables, record characteristic values, etc.). The back-end application computer server 150 may also exchange information with a remote administrator computer 160 (e.g., via a firewall 120). According to some embodiments, a system compliance assessment platform 130 of the back-end application computer server 150 may score computer systems and transmit electronic records associated with remediation recommendations to be routed to appropriate entities (e.g., who may implement those recommendations) and facilitate the display/review of those recommendations via one or more remote administrator computers 160. Note that embodiments may be associated with periodic (or asynchronous) types of review, evaluation, and/or scheduling. Further note that the back-end application computer server 150 might be associated with a third-party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may automatically scores computer systems and generates remediation recommendations. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the computer store 110. The computer store 110 might, for example, store a set of electronic records representing computer systems, each electronic record being associated with a different record identifier, record characteristic values, attribute variables, etc. The computer store 110 may also contain information about past and current interactions with parties, including those associated with remote communication devices. The computer store 110 may be locally stored or reside remote from the back-end application computer server 150. As will be described further below, the computer store 110 may be used by the back-end application computer server 150 to automatically score computer systems. Although a single back-end application computer server 150 is shown in FIG. 1, any number of such devices may be included. Moreover, various devices described herein might be combined according to embodiments of the present invention. For example, in some embodiments, the back-end application computer server 150 and computer store 110 might be co-located and/or may comprise a single apparatus.

According to some embodiments, the system 100 may automatically route electronic records associated with remediation recommendations via the automated back-end application computer server 150. For example, at (1) the remote administrator computer 160 may select a computer system to be evaluated and a desired service tier (e.g., "gold" or "silver" service as described with respect to FIG. 4). The system compliance assessment platform 130 may then access information in the computer store 110 at (2) and exchange information with the administrator at (3) to support an interactive user interface display (e.g., including an indication of one or more scores for the selected system along with remediation recommendations). The system 100 might also automatically transmit information to the remote administrator computer 160 and/or a system improvement review process workstation or platform (not illustrated in FIG. 1).

Figure 2:
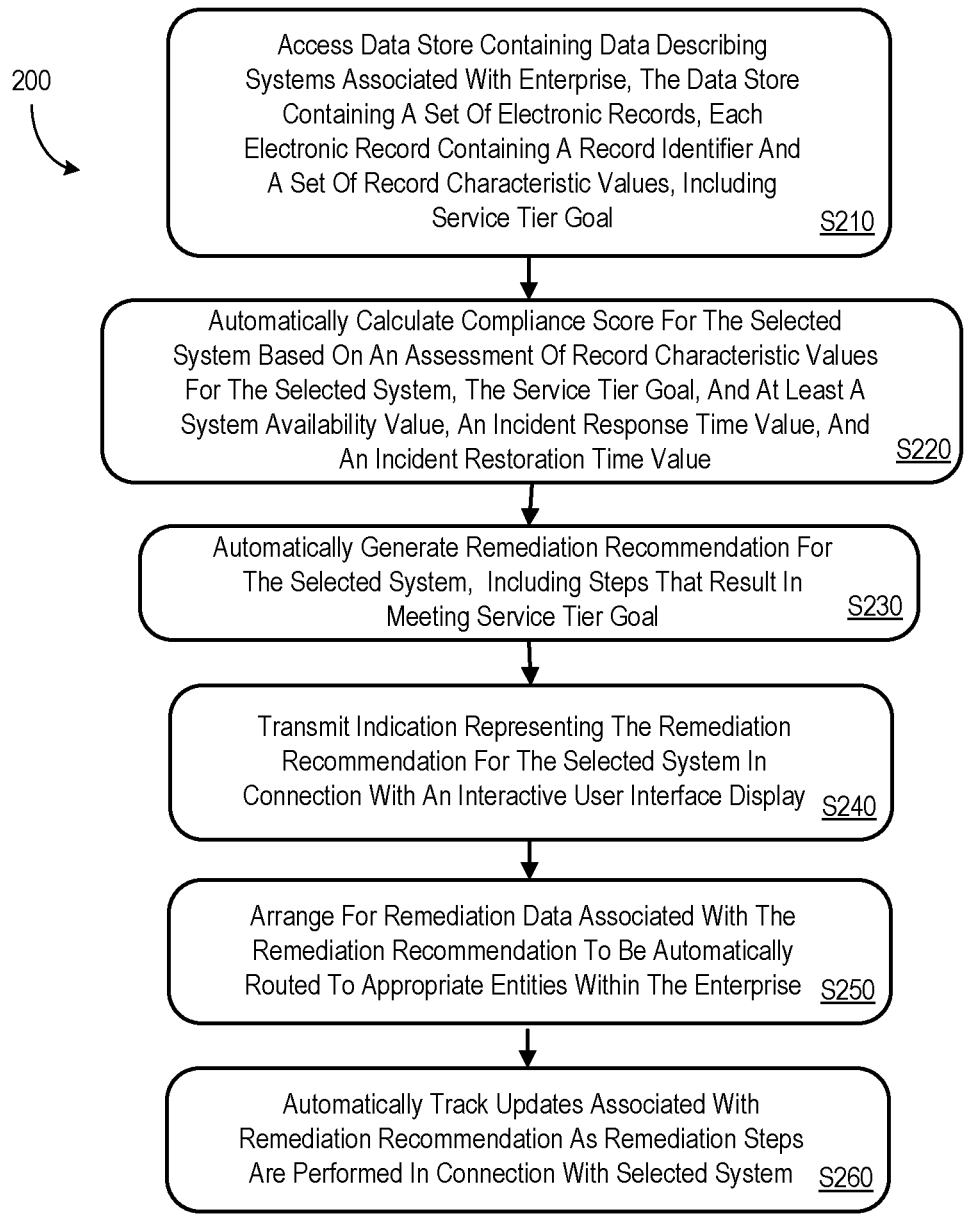
FIG. 2 illustrates a method according to some embodiments of the present invention.

Note that the system 100 of FIG. 1 is provided only as an example, and embodiments may be associated with additional elements or components. According to some embodiments, the elements of the system 100 automatically support interactive user interface displays over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, embodiments may access at least data store containing data describing systems associated with the enterprise, the data store containing a set of electronic records, wherein each electronic record contains a record identifier and a set of record characteristic values, including a service tier goal. As used herein, the phrase "selected system" might refer to, for example, an application, a service, a datacenter, a critical business process, an Infrastructure as a Service ("IaaS"), Information Technology ("IT") as a Service ("ITaaS"), a Platform as a Service ("PaaS"), a product catalog, a service catalog, and/or Software as a Service ("SaaS"). As used herein, the phrase "service tier" might refer to, for example, availability targets based on business process end user experience (as opposed to the components which make up a business process). A service tier might represent an end-to-end alignment of application, IT services and infrastructure availability targets. Moreover, service tiers may drive design, engineering, and/or operational principles. Note that reference architectures might align to service tiers requirements for applications and IT services, and that pre-engineering and/or recurring testing may help ensure that service levels are achievable. According to some embodiments, support processes and/or documentation may help ensure operational success and service tiers may drive prioritization of incident response (e.g., service level targets for each service tier might be 90% up time for bronze 95% up time for silver, and 98% up time for gold).

At S220, a compliance score may be automatically calculated for the selected system based on an assessment of record characteristic values for the selected system, the service tier goal and at least a system availability value (e.g., associated with how often the system is available to users), an incident response time value (e.g., associated with how long it takes to begin to respond to the incident), and an incident restoration time value (e.g., associated with how long it takes to resolve the situation and restore the system such that it is available to users). According to some embodiments, the service tier goal, compliance score, and remediation recommendation are associated with recoverability compliance for the selected system. For example, the service tier goal might reflect lengths of time required to respond to and restore from an occurrence of an adverse incident, such as a natural disaster. According to some embodiments, the compliance score may be automatically calculated for the selected system on a periodic basis. Note that the periodic basis could be based at least in part on the service tier goal (e.g., with systems desiring a "gold" service tier being evaluated more frequently as compared to systems desiring a "silver" service tier).

According to some embodiments, the service tier goal, compliance score, and remediation recommendation are associated with component currency compliance for the selected system. For example, the component currency compliance might represent hardware component currency compliance. In this case, the compliance score might be a risk-based calculation utilizing at least a pre-determined period of time after a hardware asset's predicted usable life (e.g., 12 months after a hardware services predicted useful life). According to other embodiments, the component currency compliance might be associated with software component currency compliance. In this case, the compliance score might be a risk-based calculation utilizing at least an end of vendor standard support, a number of major releases compared to a current release of software, and/or a predetermined period of time after a new release of software.

At S230, a remediation recommendation may be automatically generated for the selected system, the remediation recommendation including steps that, when performed, will result in the selected system meeting the service tier goal. According to some embodiments, the automatic generation of the remediation recommendation is associated with an identification of a set of compliance gaps associated with record characteristic values for the selected system. Note that in some embodiments, remediation recommendations may be partially or completely created manually (e.g., by an administrator or operation who reviews compliance scores).

At S240, an indication representing the remediation recommendation for the selected system may be transmitted in connection with an interactive user interface display. At S250, embodiments may arrange for remediation data associated with the remediation recommendation for the selected system to be automatically routed to appropriate entities within the enterprise. Note that a communication port coupled to the back-end application computer server may facilitate an exchange of electronic messages, via a distributed communication network, supporting the interactive user interface display and the routing of remediation data as appropriate. At S260, the system may automatically track updates associated with the remediation recommendation as remediation steps are performed in connection with the selected system.

As described herein, embodiments might be associated with either recoverability compliance or currency compliance. According to other embodiments, the service tier goal, compliance score, and remediation recommendation are associated with both recoverability compliance and component currency compliance for the selected system. Moreover, the service tier goal, compliance score, and remediation recommendation might, according to some embodiments, be further associated with availability compliance for the selected system.

Figure 3:
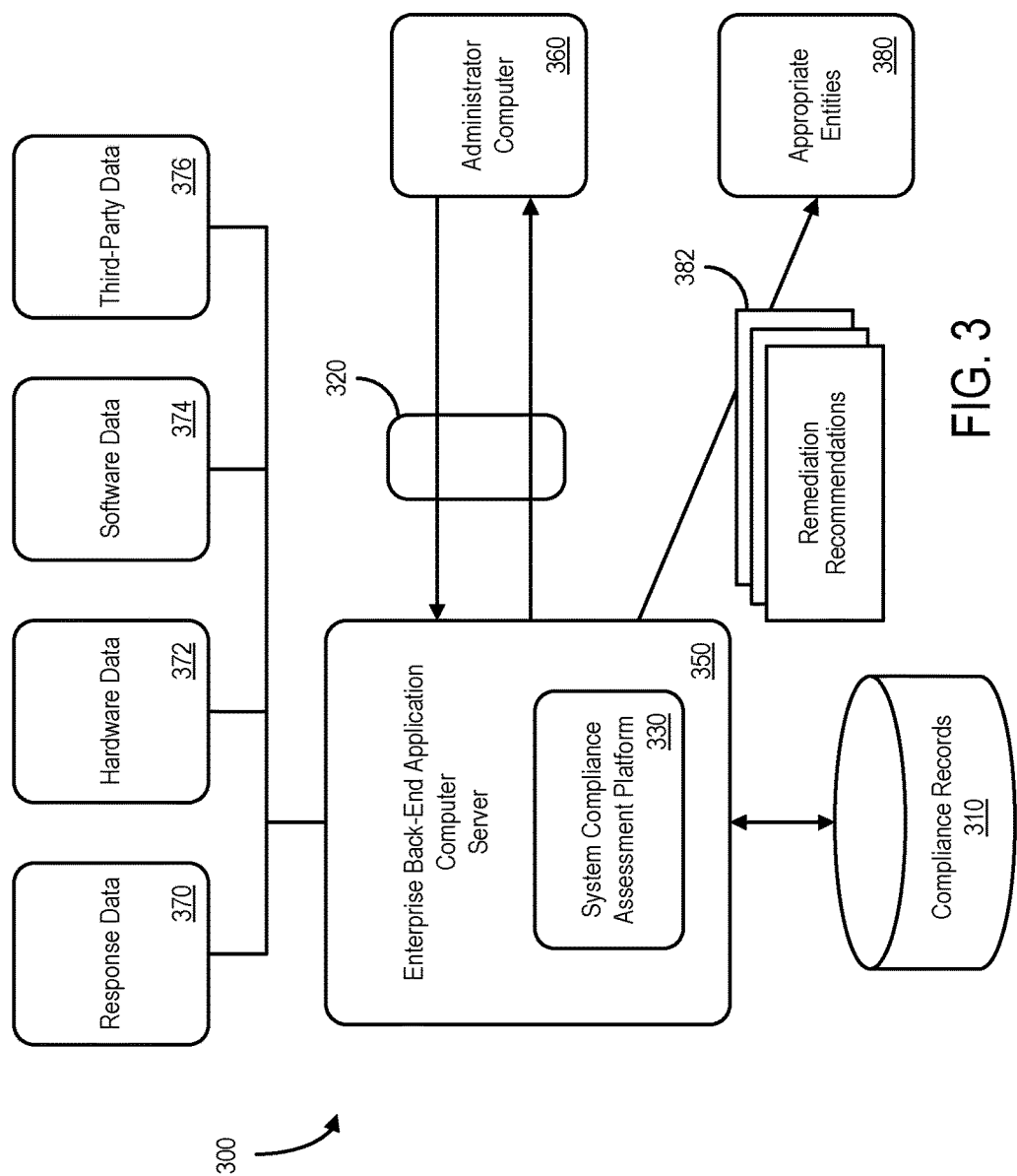
FIG. 3 is a high-level block diagram of an enterprise system according to some embodiments of the present invention.

Note that embodiments described herein may be utilized by different types of enterprises. For example, FIG. 3 is a high-level block diagram of an enterprise system 300 according to some embodiments of the present invention. As before, the system 300 includes an enterprise back-end application computer server 350 that may access a set of compliance records 310 (e.g., each record representing a computer system and including one or more identifiers, characteristic values, attribute variables, etc.). The back-end application computer server 350 may also exchange information with a remote administrator computer 360 (e.g., via a firewall 320). According to some embodiments, a system compliance assessment platform 330 of the back-end application computer server 350 may facilitate scoring of computer systems and/or the display of scores via one or more remote administrator computers 360. The back-end application computer server 350 might be, for example, associated with a PC, laptop computer, smartphone, an enterprise server, a server farm, and/or a database or similar storage devices. Devices, including those associated with the back-end application computer server 350 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

The back-end application computer server 350 may store information into and/or retrieve information from the compliance records 310. The existing compliance records 310 might, for example, store record identifiers, characteristic values (e.g., hardware models, software version numbers, etc.), and/or attribute variables. The compliance records 310 may also contain information about past and current interactions with parties, including those associated with remote communication devices.

According to some embodiments, at least some of the set of record characteristic values are associated with response data 370 (e.g., a percentage of time the system was down during the past year), hardware data 372 (e.g., platform names, device identifiers, product codes, etc.), software data 374 (e.g., software names, release dates, version numbers, installed patches or updates, etc.), and/or other data, such as third-party data 376. The enterprise back-end application computer server 350 may transmit remediation recommendations 382 to appropriate entities 380.

According to some embodiments, an enterprise may desire that a particular computer system achieve a particular level of performance or reliability. The existing hardware, software, etc. for that computer system might then be graded or scored in view of that service level or tier. For example, an enterprise might implement a service tier lifecycle process that allows an application or IT service owner to assess the platform of an application or an IT service using gathered data to determine the actual service tier of the platform at the time of the assessment. A thorough and complete service tiering assessment might, for example, require an infrastructure assessment as well as an application engineering assessment.

According to some embodiments, applications may be evaluated to ensure that the service tier mapping and business value remain unchanged (e.g., what has gold level last year is still gold level this year). The service tier assessment process might be designed to give priority to those business processes and applications that are of the greatest importance to an enterprise from a financial perspective. Note that a business process might be assigned to a specific service tier when the applications that make up that process are of that tier. In other embodiments, that might not be the case, such as when application testing is done in a standalone, non-integrated manner. Business processes might be tested by means of functional or integrated testing of the end-to-end process, such as by testing underwriting quote issuing or insurance claims payment processing. After such functional or integrated testing has taken place, it may be possible to state that applications and IT service that make up the business process are of the same service tier as the business process due to the testing that has been completed.

According to some embodiments, business processes might be assessed on a yearly basis. For "gold" tiered applications and IT services, assessments might also be performed on a yearly basis, which may be tied to disaster recovery and high availability testing cycles. For high-level "silver" tiered applications and IT services, assessments might be performed on a bi-annual basis with the exception of those that are on the yearly DR and HA testing cycle. Low-level "silver" tiered applications and IT services might be assessed every three years, and "bronze" tiered (or even non-tiered) applications and IT services might have no planned frequency for assessments.

For an application or IT service to receive a passing service tier assessment score, the following might be required to be true for the point in time when the assessment and scoring are conducted:

The current tier must be found to be equal to the target tier that was agreed to by a portfolio owner.

Availability documentation must be current and testing must be proved successful.

Recoverability disaster recovery plans must be up-to-date and validated via successful testing.

Currency, both hardware and software, must be up-to-date and within approved ranges, namely that today's currency status is green. Note that other statuses may be for planning purposes and may be allowed to be yellow or red.

Figure 4:
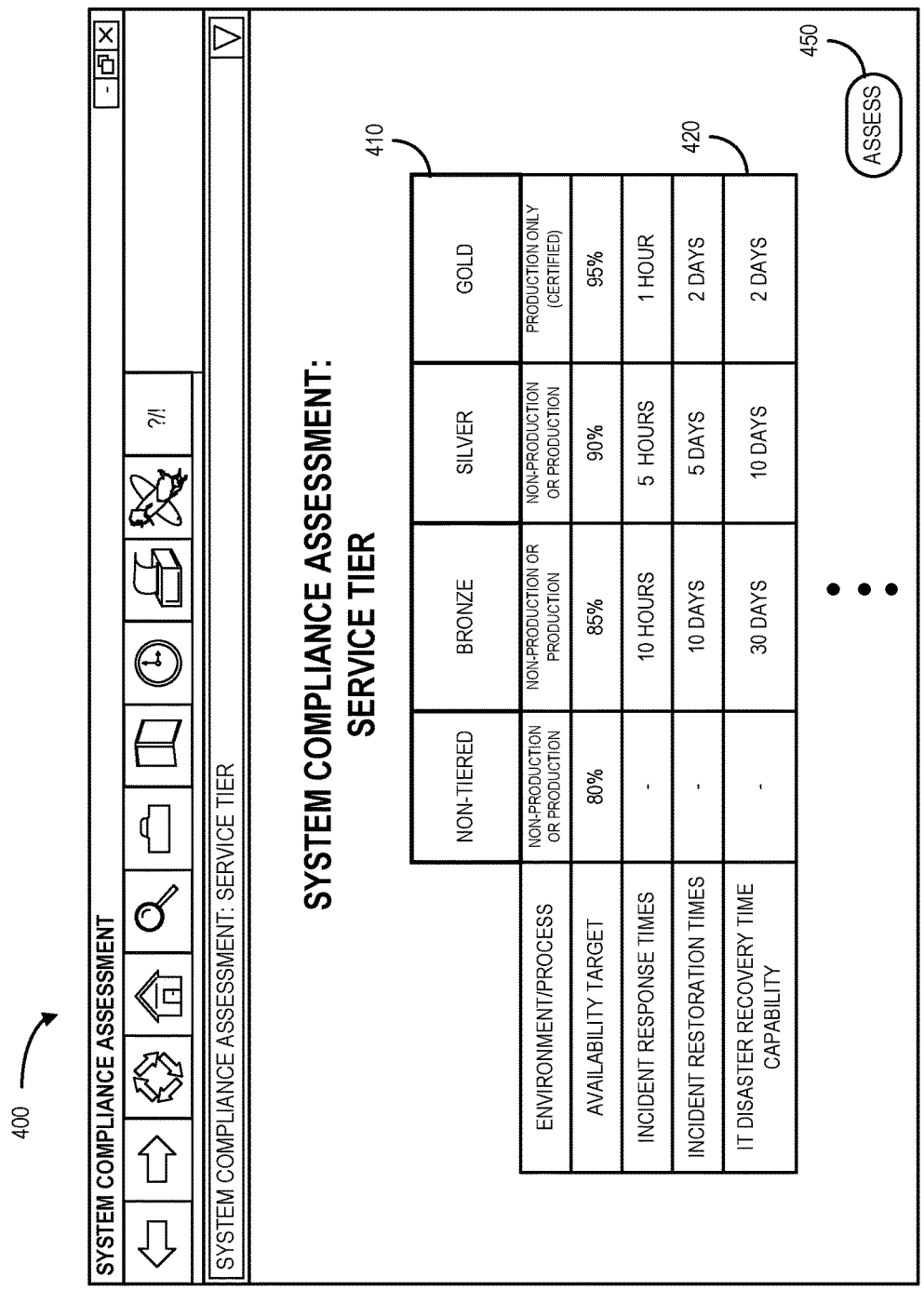
FIG. 4 illustrates an exemplary system compliance assessment service tier display that might be associated with various embodiments.

FIG. 4 illustrates an exemplary system compliance assessment service tier display 400 that might be associated with various embodiments. The display 400 includes various performance parameters (incident response times, incident restoration times, etc.) for service tier levels: "gold," "silver," "bronze" and "non-tiered." The display 400 might be used, for example, by an administration to select an appropriate performance goal for an application. According to some embodiments, some of the performance parameters are associated with an IT disaster recovery time capability. The disaster recovery time might be associated with, for example, a response to a hurricane, flood, earthquake, etc. and how long it takes to recover business operations and IT services to an operational state in the event of a declared datacenter disruption. This may deliver the following benefits: comply with predefined business objectives as established by business leaders; manage risk and vulnerability for business critical services; standardize measurements of and validate recoverability readiness; and/or ensure consistency with industry standards. According to some embodiments, a disaster recover policy applies to the production environments of all business applications and IT services hosted within a datacenter. The policy may be applied to other production application and services hosted outside of the datacenter which deliver critical business transactions. A user of the display 400 might also activate an "assess" icon 450 to have the system determine if an application meets the selected service tier 410, such as by meeting availability, incident response time, incident recovery time, and/or IT disaster recovery time capability goals 420. Note that these goals 420 might be associated with a designed level of ability and/or actual capabilities of the hardware and/or software systems that are implemented.

According to some embodiments, a hardware currency policy applies to all hardware required to operate top tier applications and IT services. The policy might not apply, according to some embodiments, to externally hosted IaaS, PaaS, or SaaS providers. Private cloud hardware configurations are an emerging technology and traditional hardware refresh intervals might not be prudent in such situations. As a result, the policy might not apply to commodity hardware that is part of a highly redundant, horizontally scalable compute platform or private cloud IaaS, or PaaS service offering.

The applications and IT Services supporting an enterprise's most important business processes might rely on a vast array of commercially available hardware. The enterprise might maintain an up to date hardware portfolio in order to: reduce cost and risk of running non-compliant hardware; ensure better vendor support, particularly during incidents; alignment with marketplace skills; and/or improved features and better performance. Note that hardware is typically targeted to be refreshed when it reaches the end of its usable life. Applications that can reduce reliance on dedicated hardware through virtualization, services, and cloud will simplify hardware currency. Whenever an application or IT service plans to make significant functional enhancements, hardware currency could be assessed to determine if a hardware refresh is warranted. According to some embodiments, roughly 20%-30% of application portfolios undergo functional enhancements annually. Addressing hardware currency during the normal application enhancements is one approach to maintaining compliance. Note that establishing independent projects to upgrade technology components and services could be used as a last resort when the risk of continued non-compliance outweighs the expense to perform a currency only upgrade.

Compliance to the hardware currency policy may be especially important to an enterprise when the following statements are true:
  Non-compliance results in a level risk to business processes that senior management is not willing to underwrite.
  The business is unable to achieve its goals because of technology integration issues, missing capabilities, or skills availability associated with non-compliant hardware.
  The total cost of ownership associated with maintaining non-compliant hardware outweighs the cost to upgrade.

According to some embodiments, hardware is considered current and compliant to the currency policy if it is within 12 months of its defined usable life. That is, compliance to the hardware currency policy might be based on the age of the hardware asset. Refresh planning should begin early enough to ensure proper lead time to retire an asset no later than 12 months after lease expiration or full depreciation. Hardware currency for an application or IT service might be determined by looking at the compliance statuses of all assets that the application or service relies upon. For example, a typical application may have a web server, a web logic instance running on shared infrastructure, an Oracle DB, and Siteminder. If any of the assets anywhere in the application stack are non-compliant, then the application could be considered to be non-compliant.

Figure 5:
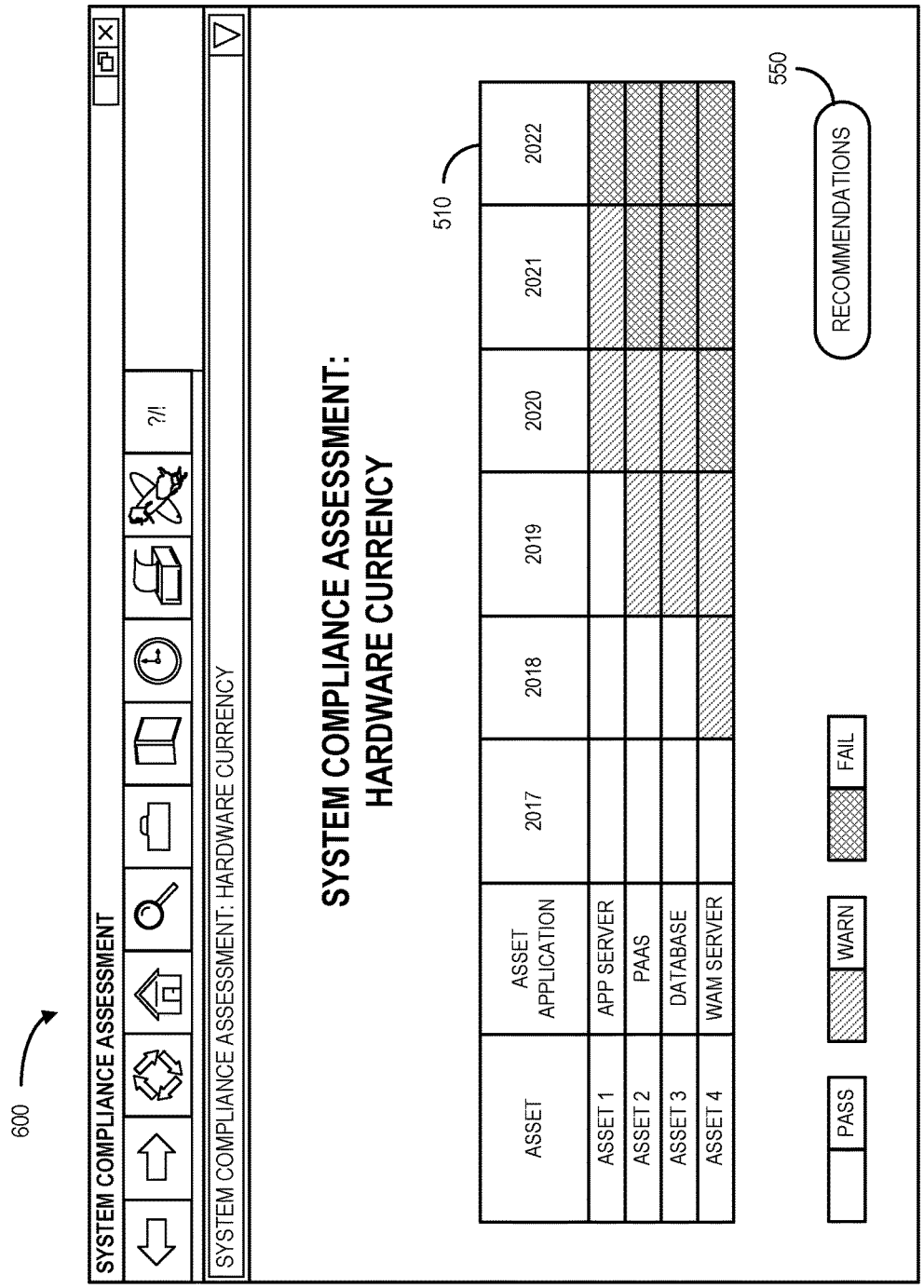
FIG. 5 illustrates an exemplary system compliance assessment hardware currency display according to some embodiments.

FIG. 5 illustrates an exemplary system compliance assessment hardware currency display 500 according to some embodiments. In this example, the display graphically indicates 510, on a yearly basis, whether various hardware assets "pass," "warn" or "fail" compliance with the hardware currency policy. According to some embodiments, a user can activate a "recommendations" icon 550 to have the system automatically generate a remediation recommendation report (e.g., listing which hardware assets need to be replaced). In some embodiments, a system may automatically discover physical and virtual assets (although, in some cases, not client devices), map their relationships to applications, and store the results in a Configuration Management Database ("CMDB"). With accurate asset information, the CMDB can house the information needed to produce a hardware currency report on an application-by-application basis. Such an approach may provide a more holistic view of technology currency in the context of our critical business processes and top tier applications. In order to accurately report on Hardware Currency, the following information might be maintained in CMDB: the application inventory; the discovered asset inventory; and the mapping of assets to applications.

Figure 6:
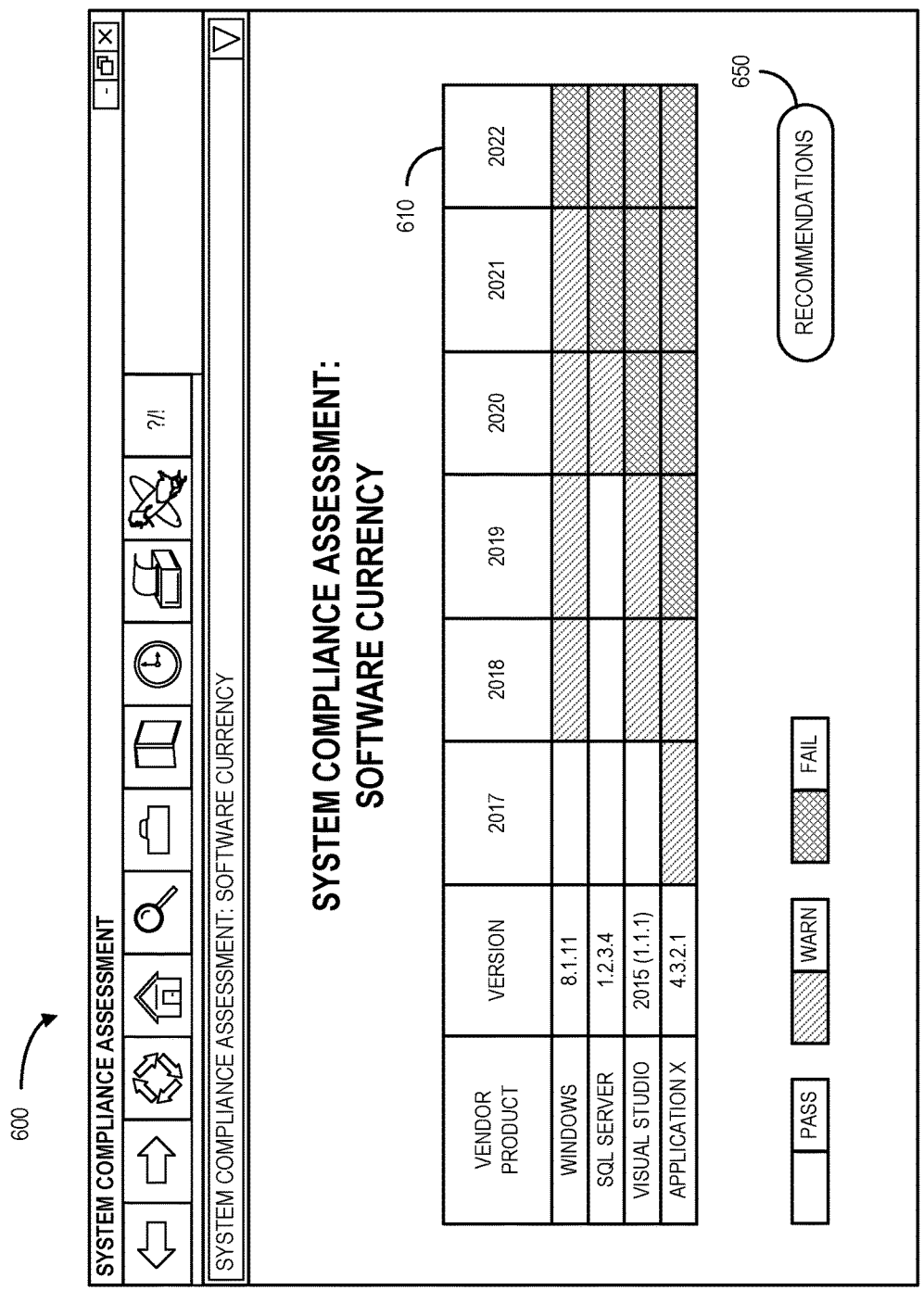
FIG. 6 illustrates an exemplary system compliance assessment software currency display that might be associated with various embodiments.

In addition to hardware currency, an enterprise might be interested in managing software currency. FIG. 6 illustrates an exemplary system compliance assessment software currency display 600 that might be associated with various embodiments. A software currency policy might, for example, apply to all commercial off-the-shelf and open source software used by applications and IT services that support an enterprise's critical business processes. Examples of software in scope for this policy might range from Operating Systems ("OSs") to infrastructure services (i.e., Oracle, Weblogic) and purchased business software. Note that the applications and IT services supporting an enterprise's most important business processes might rely on a vast array of commercially available off-the-shelf software and free open source software. The enterprise might want to maintain an up-to-date software portfolio in order to: reduce cost and risk of running non-compliant software; ensure better vendor support, particularly during incidents; align with marketplace skills; and/or reduce complexity through rationalization and fewer versions.

Whenever an application or service is planning to make significant functional enhancements, plans may be made to upgrade software to be compliant with the software currency policy. According to some embodiments, 20%-30% of the application portfolios undergo functional enhancements annually. Addressing software currency during the normal application upgrades is one approach to maintaining compliance. Note that establishing independent projects to upgrade technology components and services might be used as a last resort when the risk of continued non-compliance outweighs the expense to perform a currency only upgrade. Note that compliance to a software currency policy may be important to an enterprise when the following statements are true:
  Non-compliance results in a level risk to the enterprise's business processes that management is not willing to underwrite.
  The business is unable to achieve its goals because of technology integration issues, missing capabilities, or skills availability associated with non-compliant software.
  The total cost of ownership associated with maintaining multiple software products and/or versions outweighs the cost to upgrade.

Note that many software products undergo periodic releases of new versions. As new versions are released, older versions might be subject to a defined support schedule. Most enterprise software vendors adopt a support structure that looks like the following:
  Pre-Release: The product version has been defined, and the software may be available in alpha or beta. The bits are not locked and code base subject to change (considered non-compliant).
  Mainstream: The software has been released for general availability. The vendor fully supports the product in terms of bug fixes and potential functional enhancements (considered compliant).

Extended: Functional enhancements are no longer made and typically only security patches are available. Bug fixes are at the discretion of the vendor. Support for customer requested bug fixes may be rejected or incur an additional expense (considered compliant).

Unsupported: Vendor support is not available for this version of the product (considered non-compliant).

In addition to the vendor status, an enterprise may establish its own software lifecycle information to represent how the product should be used. Application and service owners may use this information in the planning process to identify the most appropriate software to use for their application. For example, an "emerging" application might be associated with a component that will be evaluated for strategic use by an enterprise. It may be in various stages of deployment, ranging from not deployed to limited production. As a result, component maturity is likely low as the enterprise would have little or no production experience with the component. Selection of this component for use by applications would be considered an exception and require approval. A "standard" application might be associated with a component has been declared an enterprise standard, and applications should select standard components as the default. A "declining" application might be associated with a component that is no longer a standard at the enterprise and deployment may be restricted to existing applications being expanded, or cases where maturity of standard component would result in unacceptable risk. A "retired" application might be associated with a component that can no longer be deployed at is likely no longer supported by the vendor In some embodiments, a software currency compliance report may be generated for each business/infrastructure application and IT service. The report may be generated by examining the vendor support status for each software component the application or service that it relies on. If any component or service will be beyond the standard vendor support window in the next 12-18 months, the application will be marked "Non-Compliant." Detailed interactive graphical reports may be available to let a user drill into which components are "Non-Compliant." In the example of FIG. 6, the display 600 graphically indicates 610, on a yearly basis, whether various software versions "pass," "warn" or "fail" compliance with the hardware currency policy. According to some embodiments, a user can activate a "recommendations" icon 650 to have the system automatically generate a remediation recommendation report (e.g., listing which software programs need to be replaced with newer versions). Some benefits of maintaining an up-to-date software portfolio are: reduce cost and risk of running non-compliant software; ensure better vendor support, particularly during incidents; alignment with marketplace skills; reduce complexity through rationalization and fewer versions; improved features and better performance.

Figure 7:
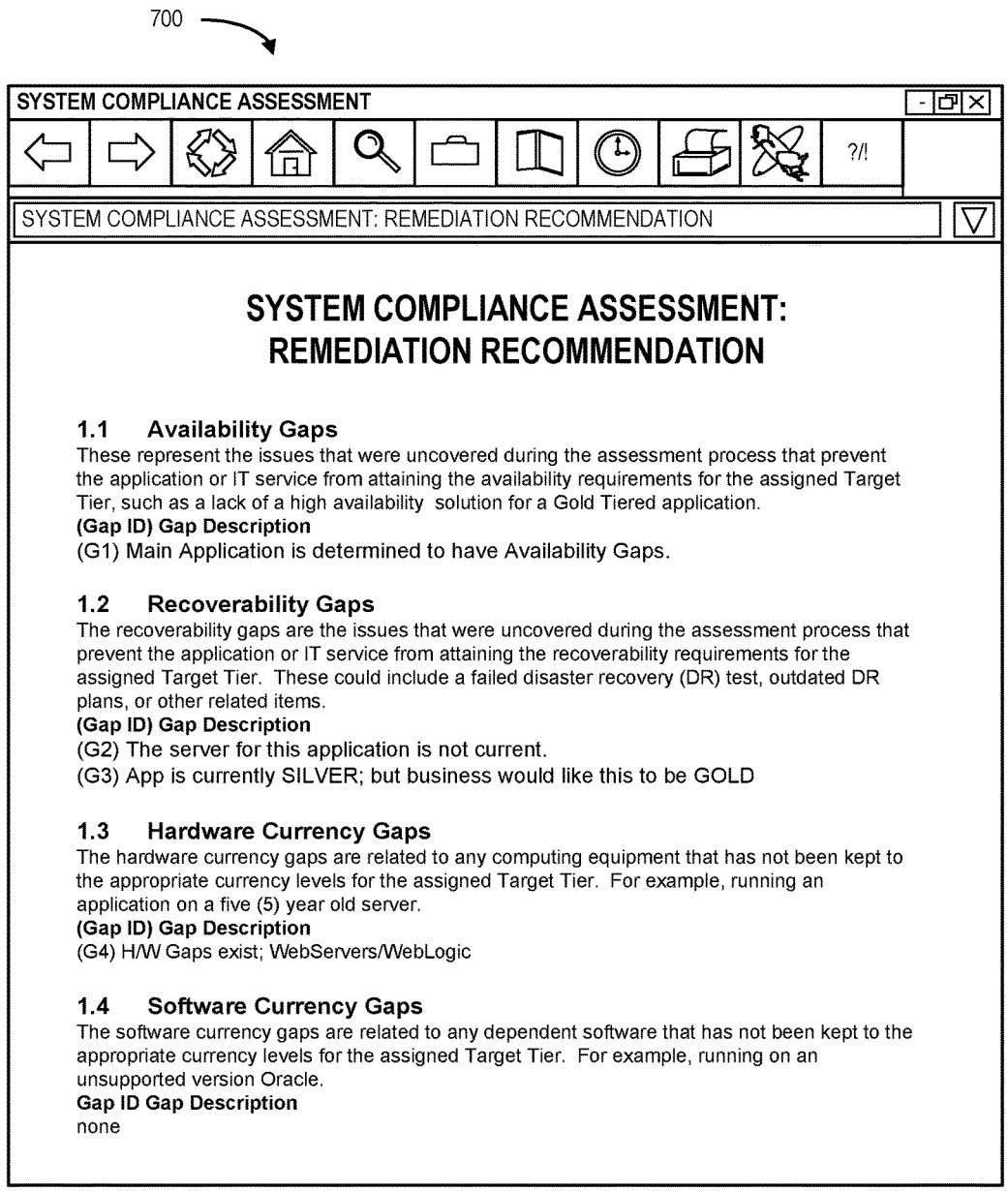
FIG. 7 illustrates an exemplary system compliance assessment remediation recommendation display according to some embodiments of the present invention.

FIG. 7 illustrates an exemplary system compliance assessment remediation recommendation display 700 according to some embodiments of the present invention. The display 700 may be intended to provide a consolidated view of the results, including gaps that were identified during the service tier assessment that was performed for the specified application or IT service. Once documented, an appropriate entity may present the recommendations for remediating the issues that were uncovered. The goal for all applications and IT services is to reach and maintain the application/service to the target tier that was assigned in order to meet the goals of being a top quartile enterprise. Therefore, it may be important that any gaps that are uncovered during the assessment process be addressed as they present material issues that can have a major impact on the businesses that rely on the application or IT service. According to some embodiments, the display might include: the name of application or IT service; the software version; a software description; a target or goal service tier; a current service tier; an availability score; a recoverability score; and/or a date of service tier assessment. The display 700 may list (e.g., with bullet points) all parts of the assessment that were found to be successful. Success should be defined as meeting or exceeding a particular service tier measurement. The display 700 may also list all parts of the assessment that were found to fail the assessment. Failure might be defined, for example, as not meeting service tier measurement. The display 700 might also list each of the gaps that were identified below and explain why the current service tier does not match the target service tier that was assigned to the specified application or IT service. The gaps may be specific regarding what the issue is and how it relates to the target tier. The display 700 might also include recommendations to resolve availability gaps and a rough order of magnitude cost of the remediation as prioritized by their ability to bring the availability to the appropriate level for the target service tier for the application or IT service.

Figure 8:
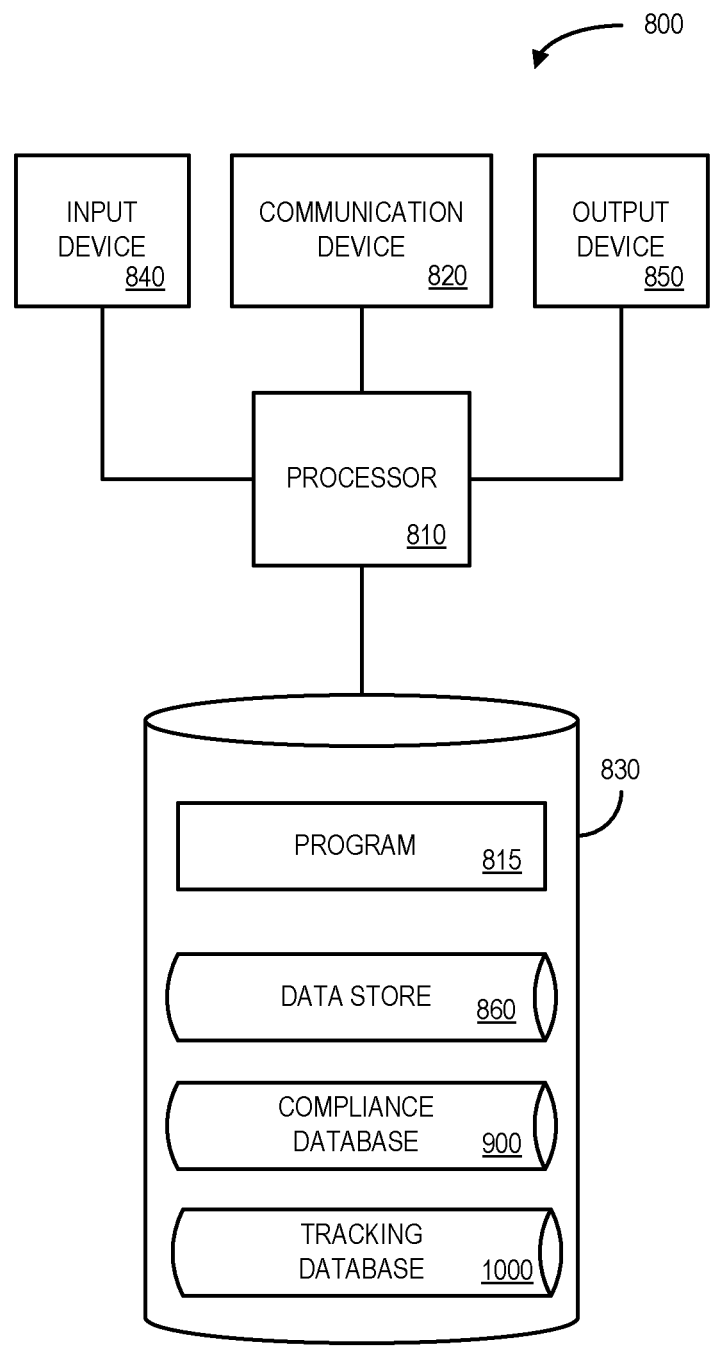
FIG. 8 is a block diagram of an apparatus in accordance with some embodiments of the present invention.

Embodiments described herein may comprise a tool that facilitates service tier assessments and may be implemented using any number of different hardware configurations. For example, FIG. 8 illustrates a back-end application computer server 800 that may be, for example, associated with the systems 100, 300 of FIGS. 1 and 3, respectively. The back-end application computer server 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote administrator computers and/or communication devices (e.g., PCs and smartphones). Note that communications exchanged via the communication device 820 may utilize security features, such as those between a public internet user and an internal network of the enterprise. The security features might be associated with, for example, web servers, firewalls, and/or PCI infrastructure. The back-end application computer server 800 further includes an input device 840 (e.g., a mouse and/or keyboard to enter information about service tiers, computer systems, assets, etc.) and an output device 850 (e.g., to output reports regarding system compliance assessments).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 815 and/or an existing association review tool or application for controlling the processor 810. The processor 810 performs instructions of the program 815, and thereby operates in accordance with any of the embodiments described herein. For example, the processor 810 may access a data store 860 that contains data describing systems associated with an enterprise. The data store 860 may contain electronic records, each containing a record identifier and a set of record characteristic values, including a service tier goal. A compliance score may be automatically calculated by the processor 810 for the selected system based on an assessment of record characteristic values for the selected system, the service tier goal, and at least a system availability value, an incident response time value, and an incident restoration time value. A remediation recommendation may be generated by the processor 810 for the selected system, including steps that, when performed, will result in the selected system meeting the service tier goal. An indication representing the remediation recommendation for the selected system may then be transmitted by the processor 810 in connection with an interactive user interface display. According to some embodiments, remediation data may be automatically routed by the processor 810 to appropriate entities within the enterprise and the system may automatically track updates associated with the remediation recommendation as remediation steps are performed in connection with the selected system.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the back-end application computer server 800 from another device; or (ii) a software application or module within the back-end application computer server 800 from another software application, module, or any other source.

In some embodiments (such as shown in FIG. 8), the storage device 830 further stores a compliance database 900 (e.g., associated with a system compliance assessment) and a remediation tracking database 1000. Examples of databases that might be used in connection with the back-end application computer server 800 will now be described in detail with respect to FIGS. 9 and 10. Note that the databases described herein are only examples, and additional and/or different information may be stored therein. Moreover, various databases might be split or combined in accordance with any of the embodiments described herein. For example, the program 815 and compliance database 900 might be combined and/or linked to each other within the storage unit 830.

Figure 9:
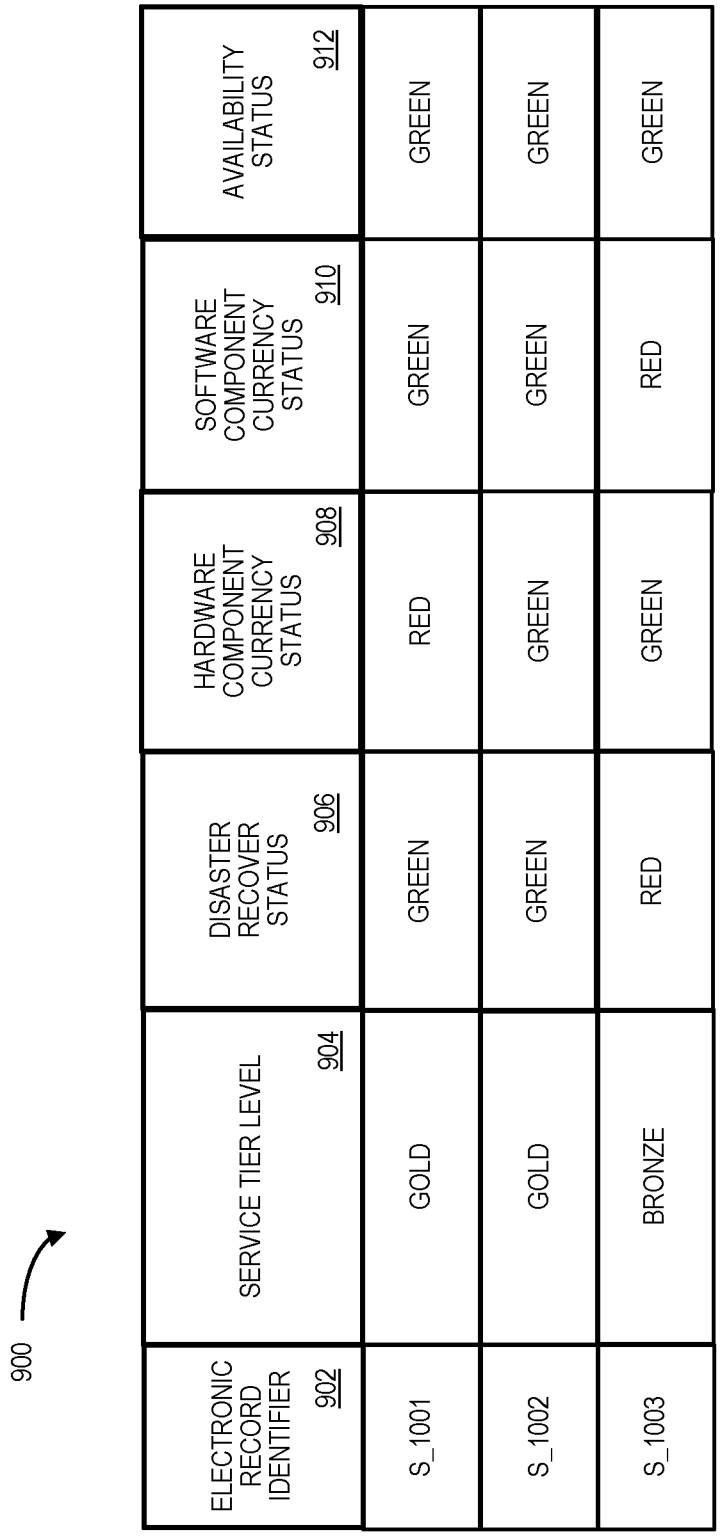
FIG. 9 is a portion of a tabular compliance database in accordance with some embodiments.

Referring to FIG. 9, a table is shown that represents the compliance database 900 that may be stored at the back-end application computer server 800 according to some embodiments. The table may include, for example, entries identifying system compliance assessments. The table may also define fields 902, 904, 906, 908, 910, 912 for each of the entries. The fields 902, 904, 906, 908, 910, 912 may, according to some embodiments, specify: an electronic record identifier 902, a service tier level 904, a disaster recover status 906, a hardware component currency status 908, a software component currency status 910, and an availability status 912. The compliance database 900 may be created and updated, for example, as system compliance assessments are performed.

The electronic record identifier 902 may be, for example, a unique alphanumeric code identifying a computer system being assessed. The service tier level 904 might indicate, according to some embodiments, a goal service tier level and/or an actual or current service tier level. The disaster recover status 906 might indicate whether or not that characteristic of the computer system meets or exceeds the performance associated with the service tier level 904 (e.g., with red indicating that the status does not comply). Similarly, the hardware component currency status 908, the software component currency status 910, and the availability status 912 indicate whether or not those characteristics of the computer systems are in compliance.

Note that the availability status 912 might be associated with a data driven approach to ensure improved enterprise application availability, including platform availability. An embodiment defines a logical sequencing of events to improve an enterprise application portfolio's availability, e.g., for customers, internal users, and business partners who rely on enterprise applications or platforms to be available and fully functional. When repeated on a consistent recurring basis (e.g., monthly, quarterly, or annually), techniques enabled by embodiments may drive improved outcomes, e.g., tailored to uniquely defined scoring criteria for the enterprise.

Figure 10:
FIG. 10 a portion of a tabular remediation tracking database in accordance with some embodiments.

FIG. 10 a portion of a tabular remediation tracking database 1000 in accordance with some embodiments. The tracking database 1000 may, for example, be stored at the back-end application computer server 800 according to some embodiments. The table may include, for example, entries identifying gaps associated with system compliance assessments. The table may also define fields 1002, 1004, 1006, 1008, 1010 for each of the entries. The fields 1002, 1004, 1006, 1008, 1010 may, according to some embodiments, specify: an electronic record identifier 1002, a gap identifier 1004, a gap description 1006, a current status 1008, and a resolution date 1010. The tracking database 1000 may be created and updated, for example, as remedial actions are taken to address the gaps (e.g., similar to the way an IT "help desk ticket" might be opened and tracked over time until resolved).

The electronic record identifier 1002 may be, for example, a unique alphanumeric code identifying a computer system being assessed and may be based on, or associated with, the electronic record identifier 902 in the compliance database 900. The gap identifier 1004 might be associated with a particular hardware gap, software gap, etc. that has been identified in the computer system. The gap description 1006 may describe the gap (e.g., indicating in what ways the computer systems does need meet the goals of the service tier). The current status 1008 and resolution date 1010 might reflect one or more remedial actions that have been performed, or that are scheduled to be performed in the future, to resolve the identified gap.

Figure 11:
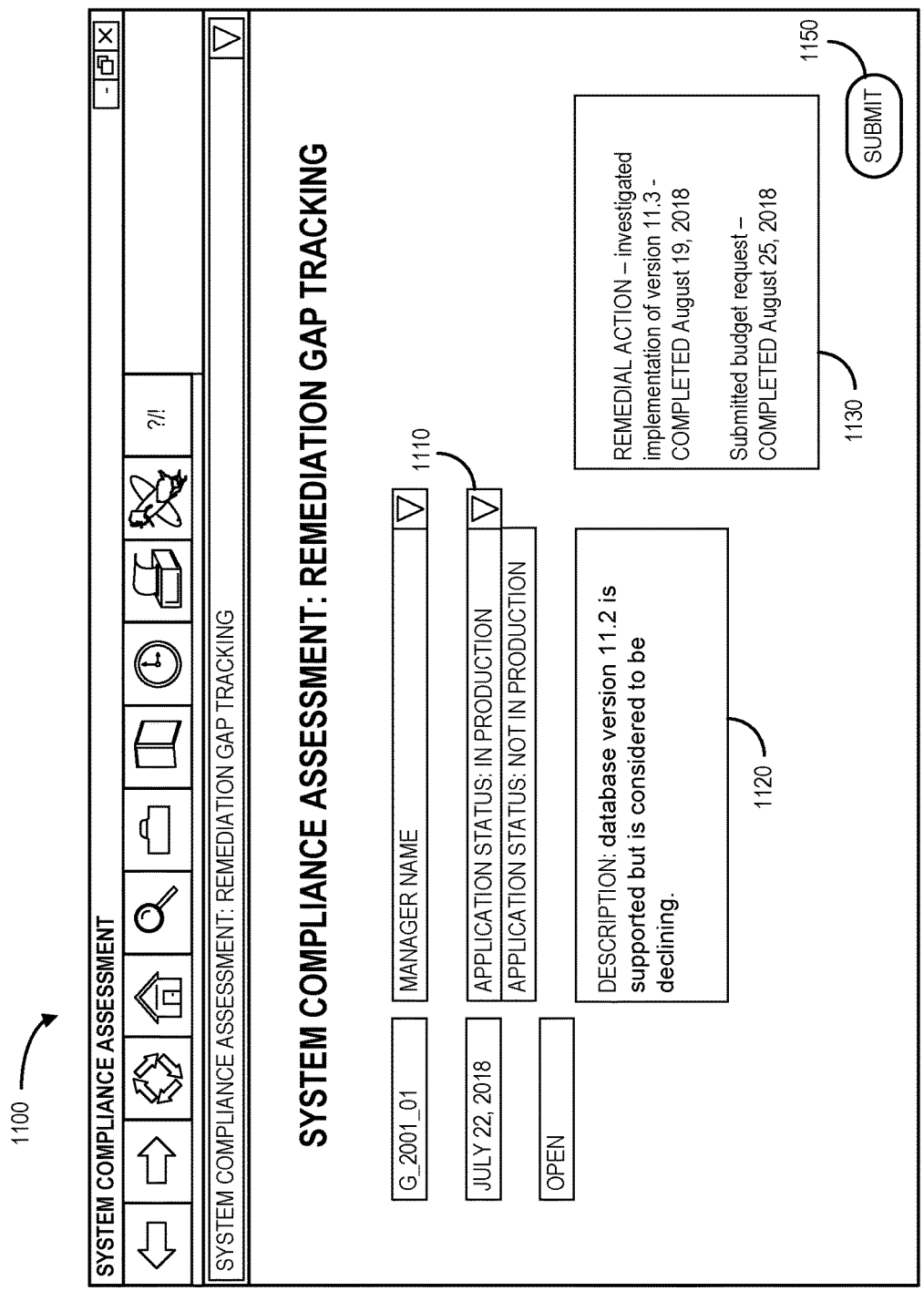
FIG. 11 is a remediation gap tracking display according to some embodiments.

FIG. 11 is a remediation gap tracking display 1100 according to some embodiments. In particular, the display 1100 may include data display and/or entry fields 1110 that indicate information about remediation gap tracking in connection with system compliance testing, such as a gap identifier, a submission date, a current status, a name of a party submitting (or handling) the gap, and/or an application status. The display 1100 may further include a description portion 1120 that explains the problem with the system in view of the appropriate service tier. The display 1100 may also include a remedial action portion 1130 listing the steps that have been taken to resolve the gap and one or more user selectable icons 1150 (e.g., to update the display 1100). Such a display might, for example, help someone monitor the resolution of gaps with respect to a desired service tier.

Figure 12:
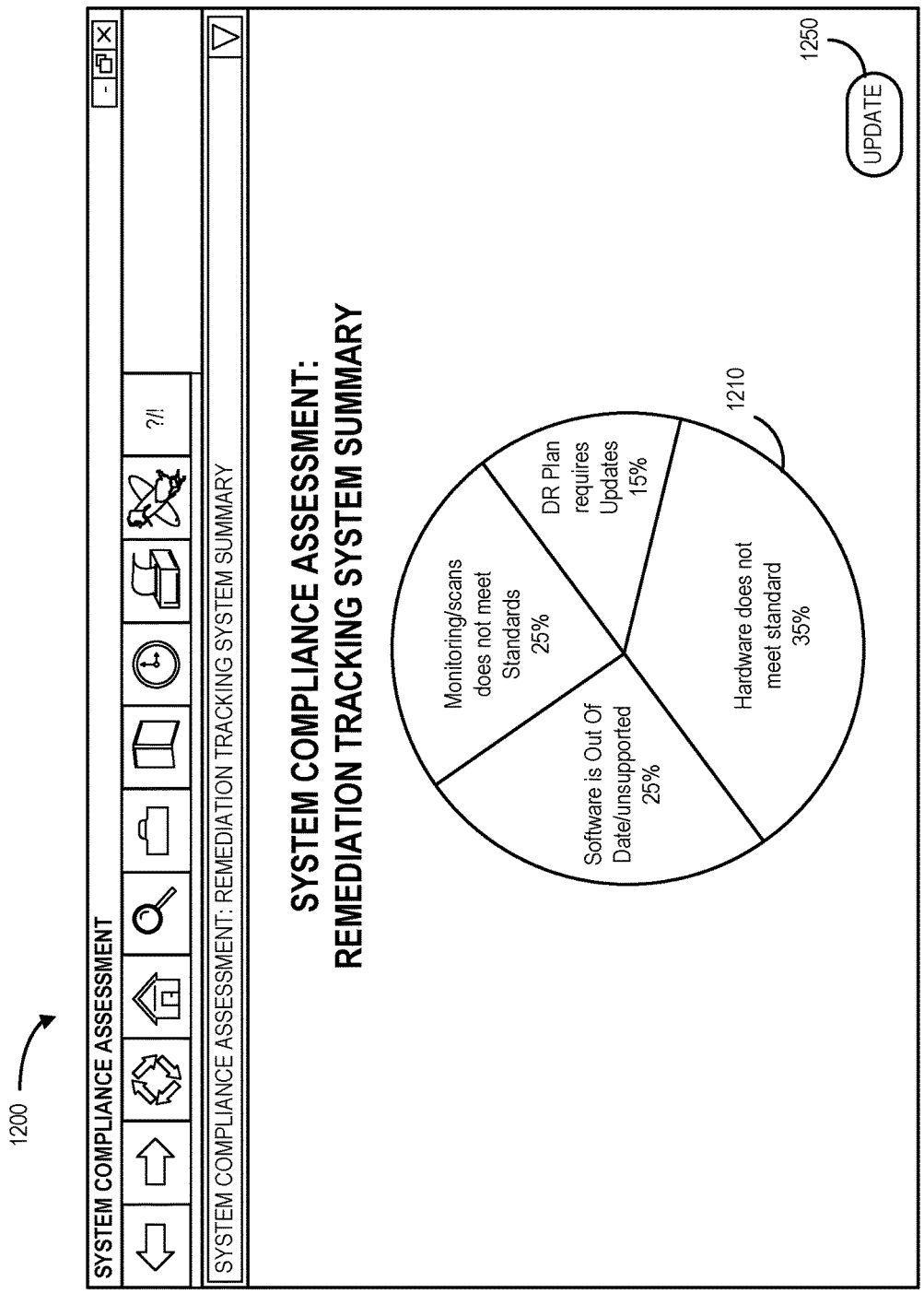
FIG. 12 is a remediation tracking system summary display according to some embodiments.

FIG. 12 is a remediation tracking system summary display 1200 according to some embodiments. That is, the display 1200 might aggregate and/or summarize compliance information associated with a number of different gaps, computer systems, lines of business, managers, service levels, etc. In the display 1200 of FIG. 12, a pie chart 1210 shows different problems that have been identified within an enterprise along with a numerical percentage associated with each problem (e.g., 25% of the systems have software that is out of date or that is unsupported). Such a display 1200 might, for example, help a manager allocate resources (e.g., IT funds or personal) in an appropriate manner. According to some embodiments, the display 1200 further includes one or more user selectable icons 1250 (e.g., to update the display 1200).

Accordingly, an embodiment provides a prioritizing system for the management of required maintenance to a portfolio of enterprise applications. The process may involve the establishment of a risk score for each known enterprise application. The enterprise applications may then be sorted according to the risk score from most at risk to least at risk and a plurality of enterprise applications (e.g., a subset, where the subset consists of a predetermined number of applications) are selected for deeper analysis. In an embodiment, a further analysis of the subset of enterprise applications involves an availability analysis.

By way of example, an availability analysis might include a determination of a technical readiness value and an operational maturity value for an enterprise application. The plurality of selected enterprise applications are scored based on the technical readiness and operational maturity, and then compared to a corresponding predetermined benchmark. An embodiment then determines if a selected enterprise application passed or failed the comparison and outputs an indication indicating the outcome of the evaluation.

Some embodiments may facilitate the efficient identification of a sub-set of enterprise application from a large portfolio of such enterprise applications, where many of the enterprise applications may be improved with respect to availability, e.g., by implementing various remediation steps. By offering such an analysis, termed herein as a risk score, each enterprise application in a large portfolio may be efficiently organized based on its existing qualities as well as its relative importance to the business. Once identified, an embodiment offers a further technological improvement in that the sub-set of enterprise applications may be further evaluated, termed herein a high availability scoring methodology, such that appropriate availability remediation for the given enterprise application may be readily identified.

Furthermore, embodiments may facilitate remediation implementation and testing, e.g., by re-evaluating enterprise applications post remediation, such that confirmation or validation of the remediation may be had, as well as continued monitoring and scoring. Thus, some embodiments provide the technology necessary to automate the repeated (e.g., continuous, periodic) evaluation of the enterprise portfolio, such that limited resources (e.g., IT professionals, capital expenses, operational expenses, etc.) may be more appropriately allocated.

Figure 13:
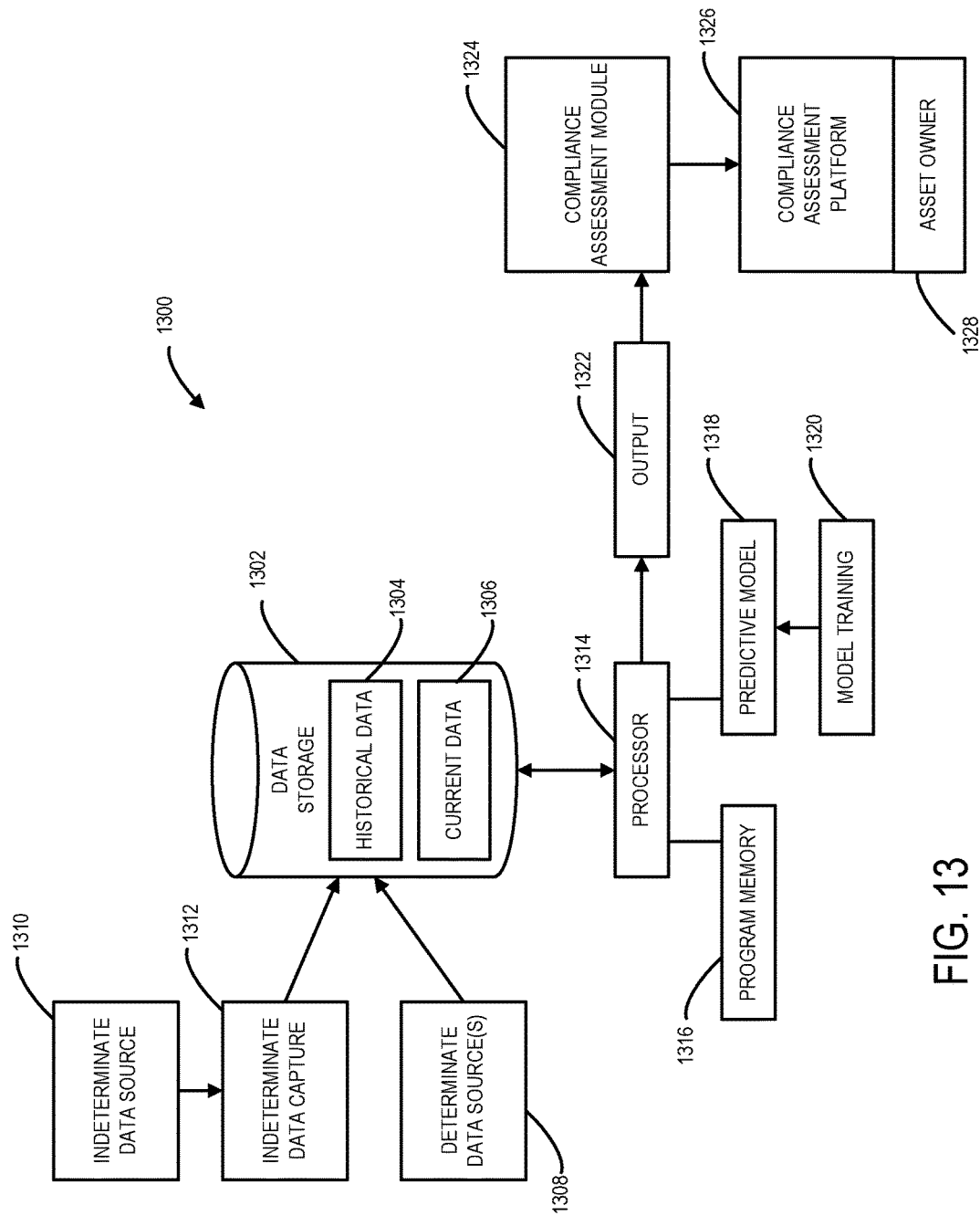
FIG. 13 illustrates a system having a predictive model in accordance with some embodiments.

According to some embodiments, one or more predictive models (e.g., decision models) may be used to select, create, update, route, and/or evaluate electronic records. Features of some embodiments associated with a predictive model will now be described by first referring to FIG. 13. FIG. 13 is a partially functional block diagram that illustrates aspects of a computer system 1300 provided in accordance with some embodiments of the invention. For present purposes it will be assumed that the computer system 1300 is operated by an insurance company (not separately shown) for the purpose of evaluating computer systems (e.g., to determine and/or prioritize which components should be upgraded).

The computer system 1300 includes a data storage module 1302. In terms of its hardware the data storage module 1302 may be conventional, and may be composed, for example, by one or more magnetic hard disk drives. A function performed by the data storage module 1302 in the computer system 1300 is to receive, store and provide access to both historical transaction data (reference numeral 1304) and current transaction data (reference numeral 1306). As described in more detail below, the historical transaction data 1304 is employed to train a predictive model to provide an output that indicates an identified performance metric (e.g., whether an existing performance metric is appropriate) and/or an algorithm to score performance factors, and the current transaction data 1306 is thereafter analyzed by the predictive model. Moreover, as time goes by, and results become known from processing current transactions (e.g., upgrades to computer systems are performed), at least some of the current transactions may be used to perform further training of the predictive model. Consequently, the predictive model may thereby appropriately adapt itself to changing conditions.

Either the historical transaction data 1304 or the current transaction data 1306 might include, according to some embodiments, determinate and indeterminate data. As used herein and in the appended claims, "determinate data" refers to verifiable facts such as a hardware model number, a software release version, a response time, down time, etc.

As used herein, "indeterminate data" refers to data or other information that is not in a predetermined format and/or location in a data record or data form. Examples of indeterminate data include narrative speech, text, image, video, and/or audio information in descriptive notes fields and signal characteristics in audible voice data files.

The determinate data may come from one or more determinate data sources 1308 that are included in the computer system 1300 and are coupled to the data storage module 1302. The determinate data may include "hard" data like software component name, a hardware asset's age, relationships between hardware and software components, etc. One possible source of the determinate data may be the insurance CMDB (not separately indicated).

The indeterminate data may originate from one or more indeterminate data sources 1310, and may be extracted from raw files or the like by one or more indeterminate data capture modules 1312. Both the indeterminate data source(s) 1310 and the indeterminate data capture module(s) 1312 may be included in the computer system 1300 and coupled directly or indirectly to the data storage module 1302. Examples of the indeterminate data source(s) 1310 may include data storage facilities for document images, for text files, and digitized recorded voice files. Examples of the indeterminate data capture module(s) 1312 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data.

The computer system 1300 also may include a computer processor 1314. The computer processor 1314 may include one or more conventional microprocessors and may operate to execute programmed instructions to provide functionality as described herein. Among other functions, the computer processor 1314 may store and retrieve historical transaction data 1304 and current transaction data 1306 in and from the data storage module 1302. Thus the computer processor 1314 may be coupled to the data storage module 1302.

The computer system 1300 may further include a program memory 1316 that is coupled to the computer processor 1314. The program memory 1316 may include one or more fixed storage devices, such as one or more hard disk drives, and one or more volatile storage devices, such as RAM devices. The program memory 1316 may be at least partially integrated with the data storage module 1302. The program memory 1316 may store one or more application programs, an operating system, device drivers, etc., all of which may contain program instruction steps for execution by the computer processor 1314.

The computer system 1300 further includes a predictive model component 1318. In certain practical embodiments of the computer system 1300, the predictive model component 1318 may effectively be implemented via the computer processor 1314, one or more application programs stored in the program memory 1316, and computer stored as a result of training operations based on the historical transaction data 1304 (and possibly also data received from a third-party). In some embodiments, data arising from model training may be stored in the data storage module 1302, or in a separate computer store (not separately shown). A function of the predictive model component 1318 may be to determine appropriate service tier level performance has been achieved (or the changes that might be made to achieve compliance). The predictive model component may be directly or indirectly coupled to the data storage module 1302.

The predictive model component 1318 may operate generally in accordance with conventional principles for mixed effect predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a mixed or fixed effect predictive model, a generalized linear model, and/or any other form of predictive model to operate as described herein.

Still further, the computer system 1300 includes a model training component 1320. The model training component 1320 may be coupled to the computer processor 1314 (directly or indirectly) and may have the function of training the predictive model component 1318 based on the historical transaction data 1304 and/or information about computer systems. (As will be understood from previous discussion, the model training component 1320 may further train the predictive model component 1318 as further relevant data becomes available.) The model training component 1320 may be embodied at least in part by the computer processor 1314 and one or more application programs stored in the program memory 1316. Thus, the training of the predictive model component 1318 by the model training component 1320 may occur in accordance with program instructions stored in the program memory 1316 and executed by the computer processor 1314.

In addition, the computer system 1300 may include an output device 1322. The output device 1322 may be coupled to the computer processor 1314. A function of the output device 1322 may be to provide an output that is indicative of (as determined by the trained predictive model component 1318) particular performance metrics, automatically flagged electronic records, identified gaps in compliance, etc. The output may be generated by the computer processor 1314 in accordance with program instructions stored in the program memory 1316 and executed by the computer processor 1314. More specifically, the output may be generated by the computer processor 1314 in response to applying the data for the current simulation to the trained predictive model component 1318. The output may, for example, be a binary value, a numerical estimate, a ranked list, and/or a likelihood within a predetermined range of numbers. In some embodiments, the output device may be implemented by a suitable program or program module executed by the computer processor 1314 in response to operation of the predictive model component 1318.

Still further, the computer system 1300 may include a compliance assessment module 1324. The compliance assessment module 1324 may be implemented in some embodiments by a software module executed by the computer processor 1314. The compliance assessment module 1324 may have the function of rendering a portion of the display on the output device 1322 and/or routing certain electronic records. Thus, the compliance assessment module 1324 may be coupled, at least functionally, to the output device 1322 and/or a workflow router. In some embodiments, for example, the compliance assessment module 1324 may report results and/or predictions by routing, to an asset owner 1328 (e.g., a hardware or software asset) via an analytics decision model platform 1326, a results log, a gap report document, and/or automatically created remediation recommendations generated by the predictive model component 1318. In some embodiments, this information may be provided to the asset owner 1328 who may also be tasked with determining how to proceed and/or whether or not the results may be improved (e.g., by making upgrades to a computer systems and/or making recommendations about the predictive model 1318).

Figure 14:
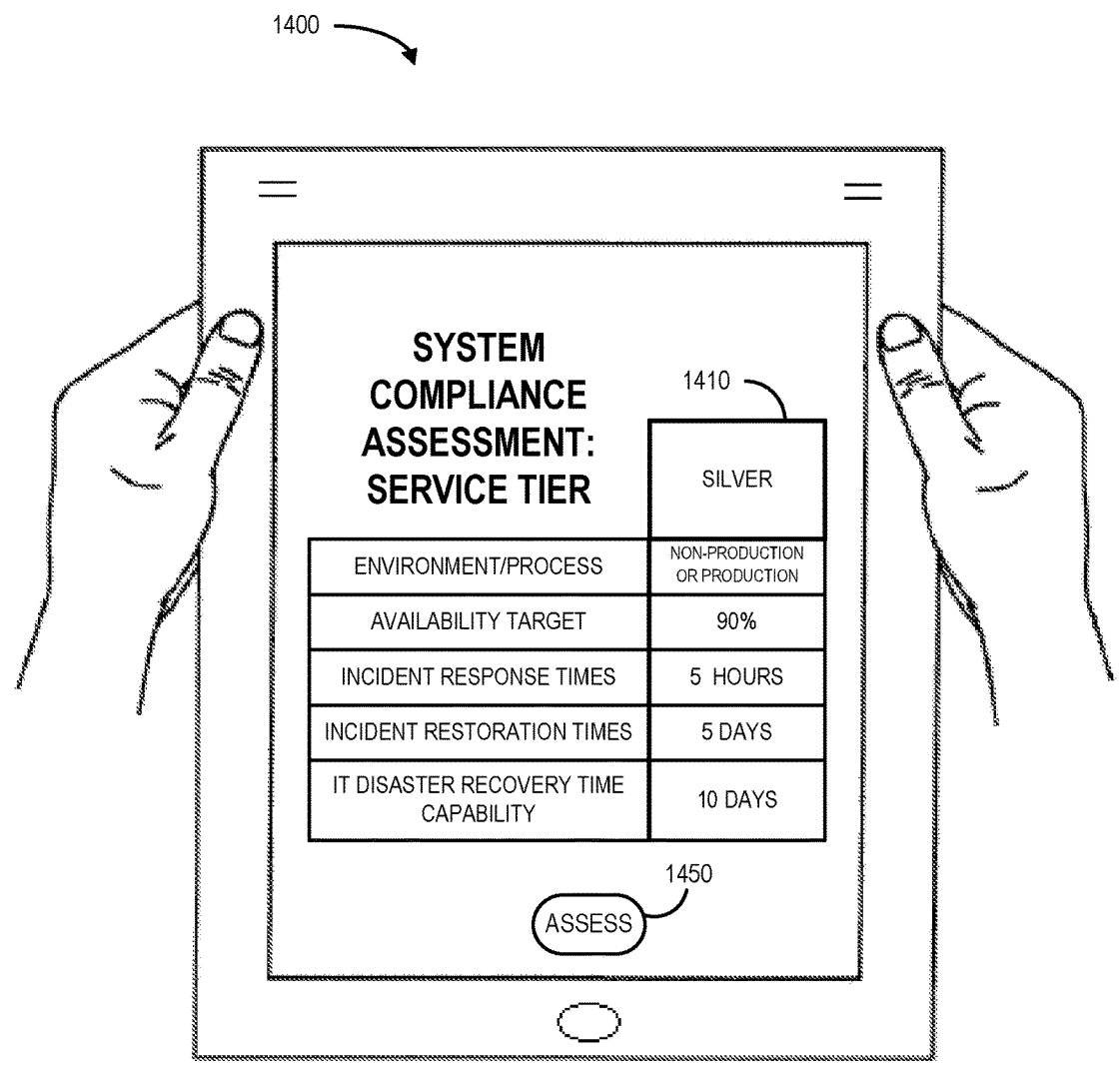
FIG. 14 illustrates a tablet computer displaying system compliance assessment service tier data according to some embodiments.

Thus, embodiments may provide an automated and efficient way to automatically assess systems for an enterprise and to generate and maintain electronic records and scores representing those systems in a way that allows for flexibility and effectiveness with respect to remedial recommendations. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications. Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of communication addresses, embodiments may instead be associated with other types of communications (e.g., chat implementations, web-based messaging, etc.). Similarly, although a certain types of record characteristic values were described in connection some embodiments, other types of data might be used instead. Still further, the displays and devices illustrated herein are only provided as examples, and embodiments may be associated with any other types of user interfaces. For example, FIG. 14 illustrates a handheld tablet computer 1400 displaying system compliance assessment service tier data 1410 according to some embodiments. The system compliance assessment service tier data 1410 might be associated with a user-selectable graphical icon 1450 that lets a user initiate a system assessment review process.

Figure 15:
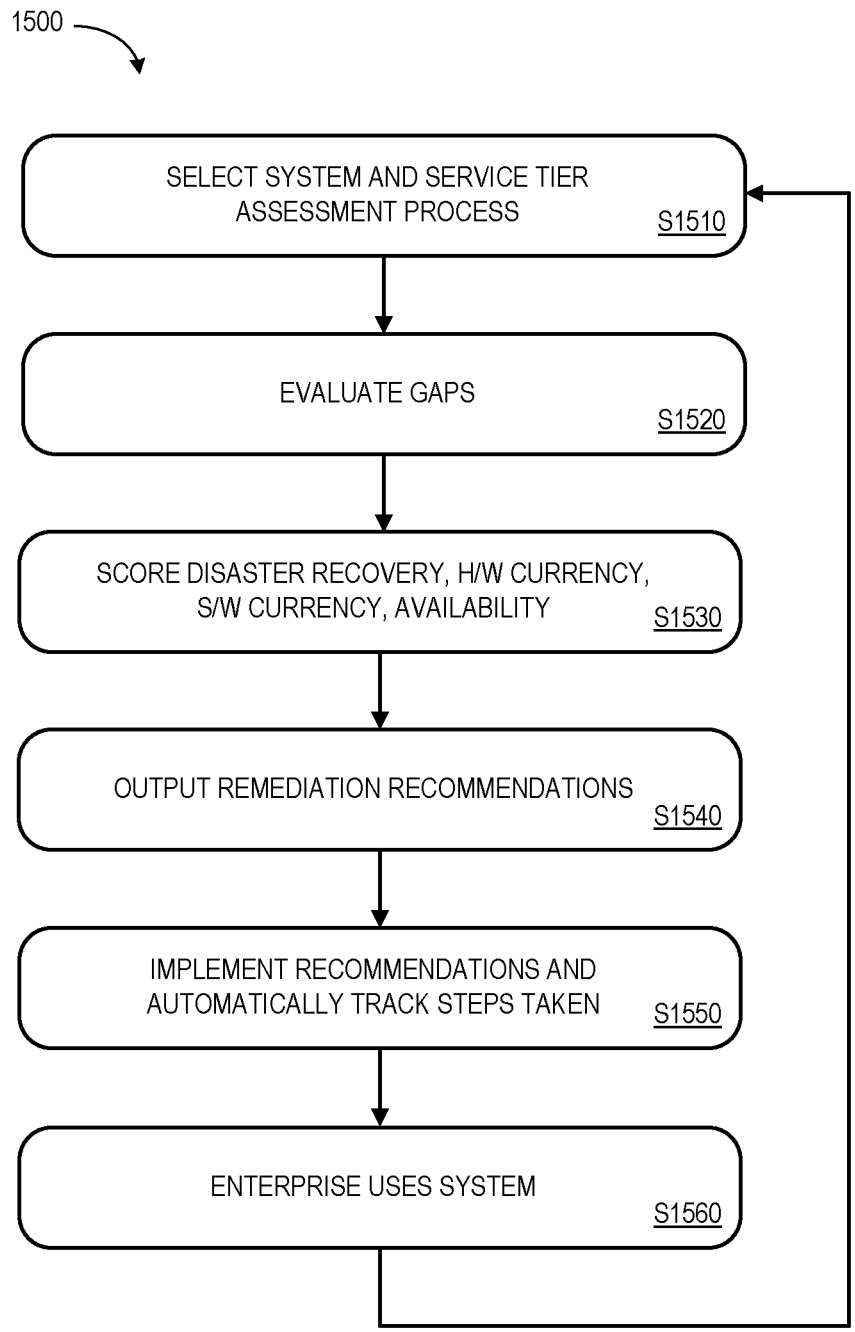
FIG. 15 illustrates an overall enterprise workflow in accordance with some embodiments.

Note that embodiments described herein might be used in connection with a number of different types of business process flows. For example, FIG. 15 illustrates an overall process 1500 in accordance with some embodiments. At S1510, a user might select a computer system to be evaluated and initiate a service tier assessment process. The process might include, for example, selection of a target or goal service tier associated with a level of performance, and an automated search and update of related hardware and software components. At S1520, gaps between the existing components and the components required to ensure an appropriate level of performance may be evaluated. At S1530, disaster recovery, hardware currency, software currency, and availability scores may be determined for the selected computer system. Based on these scores and the target service tier, remediation recommendations may be output at S1540 (e.g., recommending purchases of new hardware, updating software versions, etc.). At S1550, an appropriate entity may implement some or all of the recommendations (e.g., a business manager). The system may also automatically track the steps taken in connection with implementation of the remediation recommendations. At S1560, the enterprise may use the upgraded computer system in normal day-to-day operations. The process may then continue at S1510 when appropriate (e.g., as part of an annual review process).

Some embodiments described herein have evaluated IT assets in connection with risk management for an enterprise. Note, however, the embodiments might be associated with other types of risk management evaluations. For example, an embodiment might consider the portability of an asset with respect to a target service tier. That is, the ability to migrate an asset to a new system (e.g., as a result of a future technological change) might be evaluation instead of, or in addition to, information technology issues. Similarly, the cost effectiveness of an asset might be evaluated in connection with risk management for an enterprise. For example, a Total Cost of Ownership "TCO") over the life of an asset, a unit cost, etc. might be part of the evaluation.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to automatically assess a selected system for an enterprise via an automated back-end application computer server, comprising:
   (a) at least one data store containing data describing systems associated with the enterprise, the data store containing a set of electronic records, wherein each electronic record contains a record identifier and a set of record characteristic values, including a service tier goal;
   (b) historical data storage containing information about computer systems including identified performance metrics and associated algorithms to score the performance metrics;
   (c) a predictive model component, coupled to the historical data storage, programmed to automatically train a first predictive model that predicts if an appropriate service tier level performance has been achieved by a computer system and a second predictive model that automatically creates remediation recommendations;
   (d) the back-end application computer server, coupled to the data store, programmed to:
      (i) access the set of electronic records in the data store,
      (ii) determine a periodic basis based at least in part on the service tier goal,
      (iii) automatically, on the periodic basis, calculate a compliance score for the selected system based on an assessment of record characteristic values for the selected system, the first predictive model, the service tier goal, and all of a system availability value, an incident response time value indicating a length of time needed to respond to an incident, and an incident restoration time value indicating a length of time until the selected system will be available to users,
      (iv) automatically generate a remediation recommendation for the selected system based on the second predictive model, the remediation recommendation defining remediation steps including at least one of a purchase of new hardware and an update of a software version that, when performed, will result in the selected system meeting the service tier goal,
      (v) transmit an indication representing the remediation recommendation for the selected system in connection with an interactive user interface display,
      (vi) automatically transmit remediation data associated with the remediation recommendation for the selected system to appropriate entities within the enterprise,
      (vii) automatically track updates associated with the remediation recommendation as the remediation steps are performed in connection with the selected system, and
      (viii) transmit information associated with the updates to the predictive model component such that further training is performed for the first and second predictive models to adapt to changing conditions; and
   (e) a communication port coupled to the back-end application computer server to facilitate an exchange of electronic messages, via a distributed communication network, supporting the interactive user interface display and the transmission of the remediation data as appropriate.

2. The system of claim 1, wherein the service tier goal, compliance score, and remediation recommendation are associated with recoverability compliance for the selected system.

3. The system of claim 2, wherein the service tier goal reflects lengths of time required to respond to and restore from an occurrence of an adverse incident.

4. The system of claim 3, wherein the adverse incident is associated with a natural disaster.

5. The system of claim 4, wherein the selected system is associated with a production environment of at least one of: an application, a service, a datacenter, a critical business process, an infrastructure as a service, information technology as a service, a platform as a service, a product catalog, a service catalog, and software as a service.

6. The system of claim 1, wherein the service tier goal, compliance score, and remediation recommendation are associated with component currency compliance for the selected system.

7. The system of claim 6, wherein the component currency compliance comprises hardware component currency compliance.

8. The system of claim 7, wherein the compliance score is a risk-based calculation utilizing at least a pre-determined period of time after a hardware asset's predicted usable life.

9. The system of claim 6, wherein the component currency compliance comprises software component currency compliance.

10. The system of claim 9, wherein the compliance score is a risk-based calculation utilizing at least an end of vendor standard support, a number of software releases compared to a current release of software, and a predetermined period of time after a new release of software.

11. The system of claim 1, wherein the automatic generation of the remediation recommendation is associated with an identification of a set of compliance gaps associated with record characteristic values for the selected system.

12. The system of claim 1, wherein the service tier goal, compliance score, and remediation recommendation are associated with both recoverability compliance and component currency compliance for the selected system.

13. The system of claim 12, wherein the service tier goal, compliance score, and remediation recommendation are further associated with availability compliance for the selected system.

14. A computerized method to automatically assess a selected system for an enterprise via an automated back-end application computer server, comprising:
 accessing, by a predictive model component, historical data storage containing information about computer systems including identified performance metrics and associated algorithms to score the performance metrics;
 automatically training, by the predictive model component, a first predictive model that predicts if an appropriate service tier level performance has been achieved by a computer system;
 automatically training, by the predictive model component, a second predictive model that automatically creates remediation recommendations;
 accessing a data store containing data describing systems associated with the enterprise, the data store containing a set of electronic records, wherein each electronic record contains a record identifier and a set of record characteristic values, including a service tier goal;
 determining a periodic basis based at least in part on the service tier goal;
 automatically calculating, by the back-end application computer server on the periodic basis, a compliance score for the selected system based on an assessment of record characteristic values for the selected system, the first predictive model, the service tier goal, and all of a system availability value, an incident response time value indicating a length of time needed to respond to an incident, and an incident restoration time value indicating a length of time until the selected system will be available to users;
 automatically generating, by the back-end application computer server, a remediation recommendation for the selected system based on the second predictive model, the remediation recommendation defining remediation steps including at least one of a purchase of new hardware and an update of a software version that, when performed, will result in the selected system meeting the service tier goal;
 transmitting an indication representing the remediation recommendation for the selected system in connection with an interactive user interface display;
 automatically transmitting remediation data associated with the remediation recommendation for the selected system to appropriate entities within the enterprise, wherein a communication port coupled to the back-end application computer server facilitates an exchange of electronic messages, via a distributed communication network, supporting the interactive user interface display and the transmission of the remediation data as appropriate;
 automatically tracking updates associated with the remediation recommendation as the remediation steps are performed in connection with the selected system; and
 transmitting, from the back-end application computer server to the predictive model component, information associated with the updates such that further training is performed for the first and second predictive models to adapt to changing conditions.

15. The method of claim 14, wherein the service tier goal, compliance score, and remediation recommendation are associated with both recoverability compliance and component currency compliance for the selected system.

16. A non-transitory, computer-readable medium storing instructions, that, when executed by a processor, cause the processor to perform a method to automatically assess a selected system for an enterprise via an automated back-end application computer server, the method comprising:
 accessing, by a predictive model component, historical data storage containing information about computer systems including identified performance metrics and associated algorithms to score the performance metrics;
 automatically training, by the predictive model component, a first predictive model that predicts if an appropriate service tier level performance has been achieved by a computer system;
 automatically training, by the predictive model component, a second predictive model that automatically creates remediation recommendations;
 accessing, by the back-end application computer server, a data store containing data describing systems associated with the enterprise, the data store containing a set of electronic records, wherein each electronic record contains a record identifier and a set of record characteristic values, including a service tier goal;
 determining, by the back-end application computer server, a periodic basis based at least in part on the service tier goal;
 automatically calculating, by the back-end application computer server on the periodic basis, a compliance score for the selected system based on an assessment of record characteristic values for the selected system, the first predictive model, the service tier goal, and all of a system availability value, an incident response time value indicating a length of time needed to respond to an incident, and an incident restoration time value indicating a length of time until the selected system will be available to users;
 automatically generating, by the back-end application computer server, a remediation recommendation for the selected system based on the second predictive model, the remediation recommendation defining remediation steps including at least one of a purchase of new hardware and an update of a software version that, when performed, will result in the selected system meeting the service tier goal;
 transmitting, by the back-end application computer server, an indication representing the remediation recommendation for the selected system in connection with an interactive user interface display;
 automatically transmitting, by the back-end application computer server, remediation data associated with the remediation recommendation for the selected system to appropriate entities within the enterprise, wherein a communication port coupled to the back-end application computer server facilitates an exchange of electronic messages, via a distributed communication network, supporting the interactive user interface display and the transmission of the remediation data as appropriate;

automatically tracking, by the back-end application computer server, updates associated with the remediation recommendation as remediation steps are performed in connection with the selected system; and transmitting, from the back-end application computer server to the predictive model component, information associated with the updates such that further training is performed for the first and second predictive models to adapt to changing conditions.

17. The medium of claim 16, wherein the service tier goal, compliance score, and remediation recommendation are associated with both recoverability compliance and component currency compliance for the selected system.

\* \* \* \* \*